May 1, 1951  R. A. SHAW  2,550,872
TOGGLE CONTROLLED DOOR OPERATING MECHANISM
FOR DISPENSING CABINETS
Filed Oct. 3, 1947  3 Sheets-Sheet 1
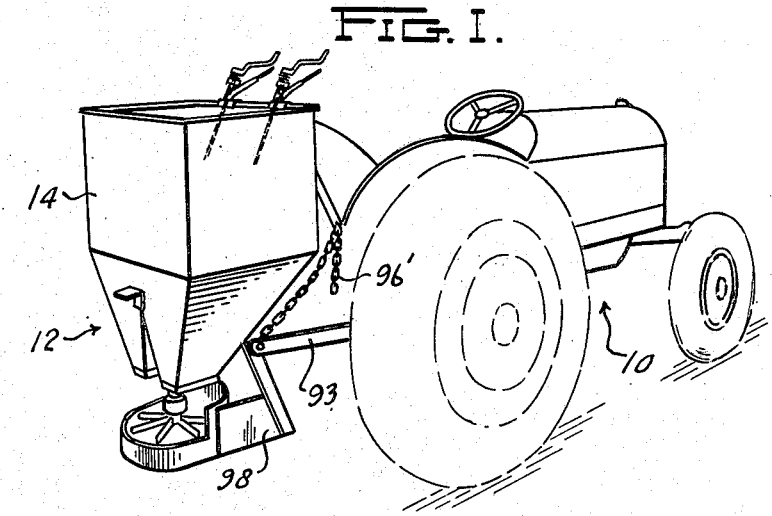
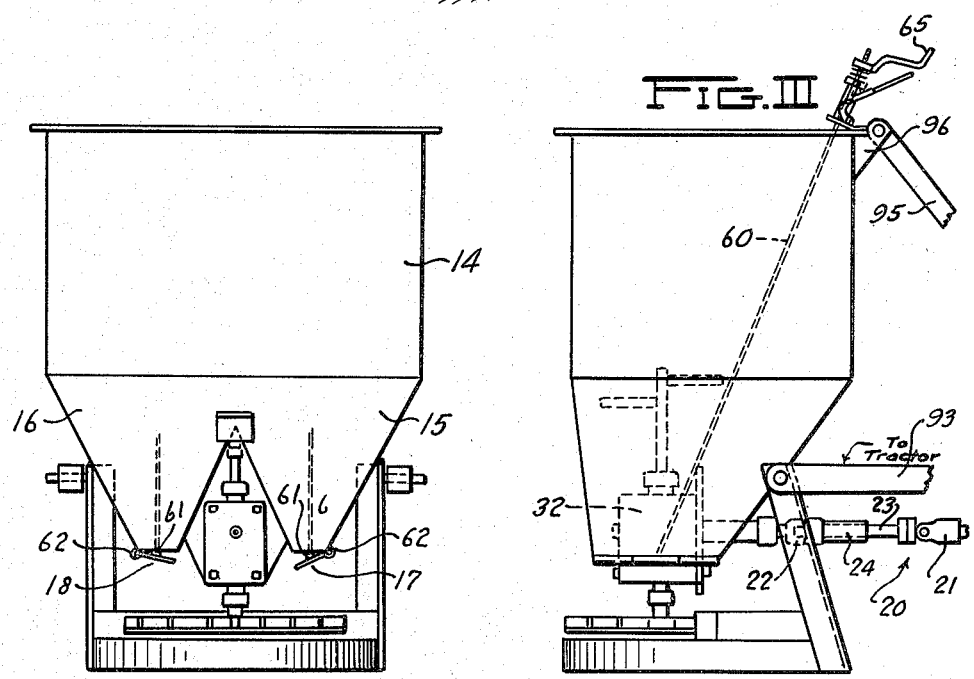
INVENTOR
Roy A. Shaw
BY Edmund B. Whitcomb
ATTORNEY May 1, 1951
R. A. SHAW
2,550,872
TOGGLE CONTROLLED DOOR OPERATING MECHANISM
FOR DISPENSING CABINETS
Filed Oct. 3, 1947
3 Sheets-Sheet 2
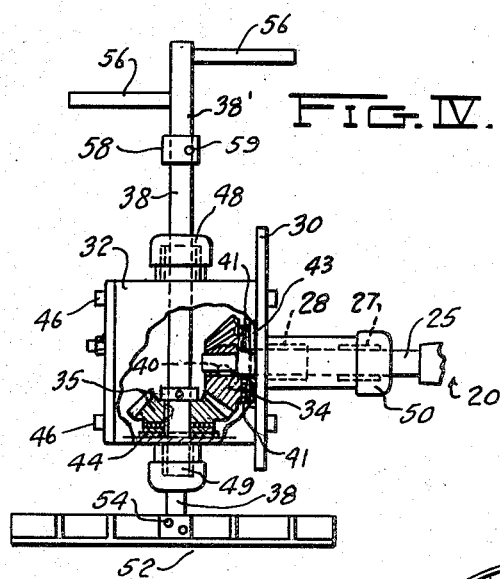
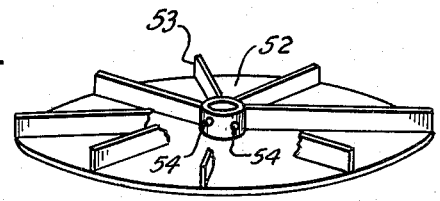
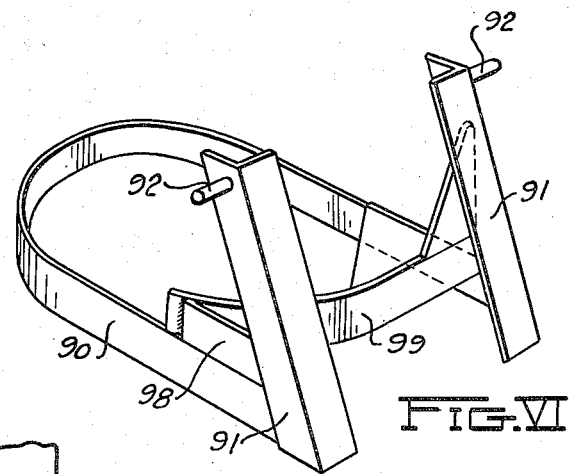
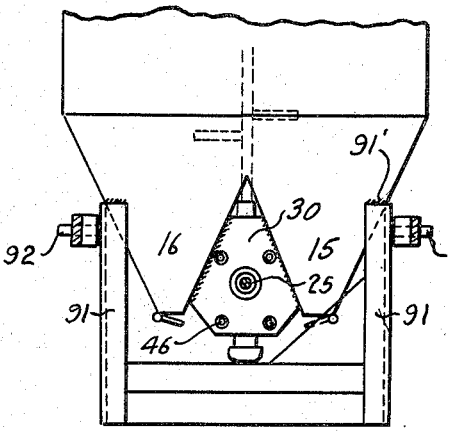
INVENTOR
Roy A. Shaw
BY
ATTORNEY FIG. VIII.
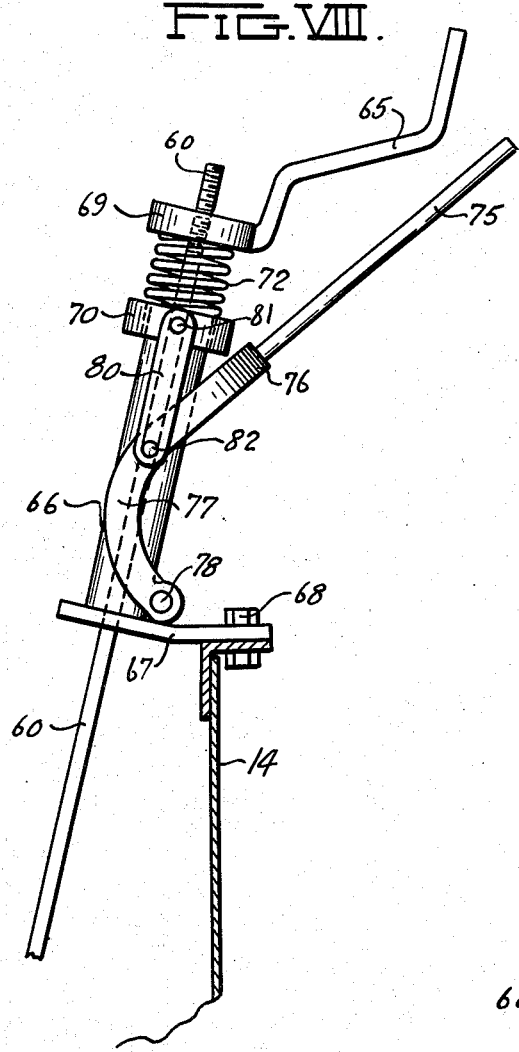
FIG. IX.
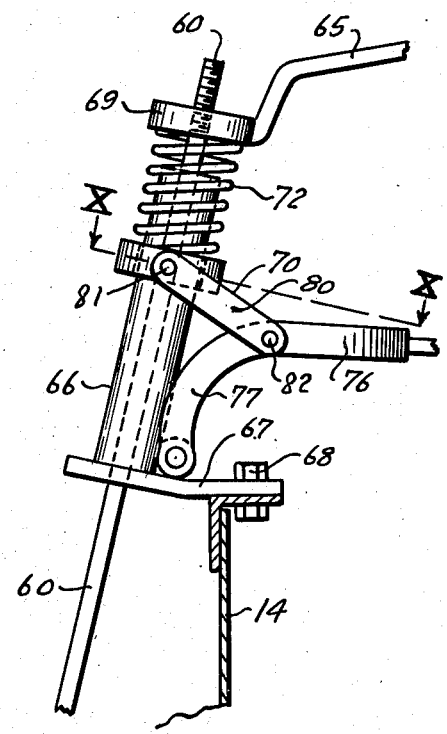
FIG. X.
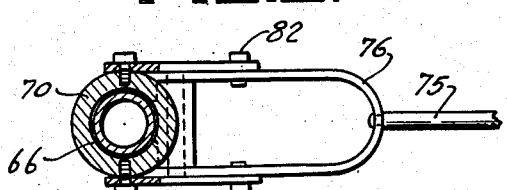
INVENTOR
Roy A. Shaw
BY
ATTORNEY Patented May 1, 1951

2,550,872

UNITED STATES PATENT OFFICE 2,550,872

TOGGLE CONTROLLED DOOR OPERATING MECHANISM FOR DISPENSING CABINETS

Roy A. Shaw, San Bernardino, Calif.

Application October 3, 1947, Serial No. 777,615

1 Claim. (Cl. 222—510)

This invention relates to a mechanical distribution mechanism for distributing or uniformly broadcasting commercial fertilizers, crushed limestone, lime, slag, barley, oats, peas, grass seed, poison bait or anything of like nature, and is an improvement on my co-pending application, Serial No. 688,814, filed August 7, 1946, for "Material Distributor."

The object of the present invention is to produce a compact, trouble free, efficient distributing mechanism, which is economical in use and cutting down waste as the control of the distribution may be efficiently and accurately maintained, and a mechanism easy to operate and positive in action.

Another object of the invention is to provide an improved drive in which the gearing connection from the power take off of a tractor to the spinner mechanism of the distributor and to the agitation mechanism employed within the hopper of the unit are constructed and assembled in a manner to facilitate a balanced cooperative construction.

Another object of the invention is to provide an improved quick action door control which may be readily, manually operated and works instantly to control the feed of the material onto the distributing spinner plate.

A further object of the present invention is the production of an improved spreader stand and attaching bracket by which the device can be supported when not in use, but also readily attached to the tractor for use as desired, the construction throughout being rugged and strong, suitably welded to insure satisfactory use in service.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure I is a perspective view of my distributor shown attached to a tractor;

Figure II is a vertical rear end elevational view of the distributor shown in Figure I;

Figure III is a side elevational view thereof;

Figure IV is an elevational view, partly in section, of the gear box and combined spinner plate and agitator shaft mechanism;

Figure V is a perspective view of the detached spinner plate.

Figure VI is a perspective view of the distributor stand and attaching frame;

Figure VII is an elevational view taken from the opposite side of the distributor from that illustrated in Figure II;

Figure VIII is an elevational view of my improved toggle door release mechanism—the door in closed position;

Figure IX is a view similar to Figure VIII with the toggle mechanism in position when the door is open;

Figure X is a sectional view taken on the line X—X, Figure IX.

Referring to Figure I, a tractor 10 is illustrated with my improved distributor 12 attached thereto. The distributor consists of a hopper 14, and as illustrated in this particular embodiment of my invention, the construction throughout is welded where desirable to form a good solid distributing mechanism; and as shown in Figure II, the hopper 14 has two discharge funnels 15 and 16, the outlets of which are controlled by doors 17 and 18, the controlling mechanism to be hereinafter more fully set forth.

Primarily, the distributing mechanism includes an articulated drive shaft 20 (see Figure III), said drive shaft adapted to be coupled with the power take off of the tractor 10. The shaft 20 includes a pair of universal joints 21 and 22 and a two-part sliding drive shaft joint indicated at 23 and 24. The universal joint 22 adjacent the hopper 14 has a stud shaft 25—see Figure IV—mounted in a pair of bronze sleeve bearings 27 and 28 supported from a triangularly shaped bracket 30 adapted to be welded to the hopper funnels 15 and 16 and form a support for the gear box 32, illustrated in Figures III and IV, one of the features of my invention being to provide a type of gear drive which may be mounted in oil for extremely efficient operation. Thus, the gear box 32 provided with oil filler contains a pair of spur gears 34 and 35 for right angled transmission of power from the horizontal drive shaft 20 to the vertically arranged, articulated combined spinner and agitator drive shaft 38 and 38'.

One of the objects of the present invention, as stated supra, is to provide a compact, trouble-free, rugged mechanism of the character indicated, and as one embodiment thereof, I have found it desirable to attach the spur gear 34 to the shaft 25 by a locking key 40 and the use of two Allen set screws 41 and gear 35 to shaft 38 in the same manner. Between the hub of the spur gears 34 and 35 and the end wall of the gear box, I provide bronze thrust washers 43 and 44.

Four bolts 46 in the particular embodiment of my invention, here illustrated, securely fastens the gear box 32 to the bracket or plate 30 which, as stated above, is, in turn, welded to the hopper 14.

At the top and bottom of the gear box 32, the shaft 38 passes through suitable packing glands 48 and 49 and a similar packing gland 50 surrounds the stub shaft 25 as shown in Figure IV.

The spinner plate 52, having the radial vanes 53 is secured by a pair of Allen set screws 54 to the lower end of shaft 38 while a plurality of agitator rods 56 are secured to the other end of shaft 38, said rods consisting of the agitator mechanism for stirring the material contained within the hopper 14. Specifically, the agitator mechanism may include as a separate assembly the radial arms 56 and a stub shaft 38' connected by coupling 58 to the shaft 38 and here I also use an Allen set screw 59 to secure the shafts 38 and 38' together.

From the foregoing, it will be seen that the power drive shaft 20 is a double universal connection to the power take off of the tractor and may also slide fore and aft. Moreover, the gear box 32 and driving mechanism constitute a very satisfactory arrangement and the balancing of the spinner plate 52 on one end of shaft 38 with the agitating mechanism 56 on the other end has a balancing effect which materially improves the overall operation of my distributing mechanism.

I have provided a special quick acting control for the doors 17 and 18, which includes a pair of rods 60 pivoted at 61 to the doors, which in turn are hinged at 62 to the outside lower edge of the hopper funnels 15 and 16. The rods 60 extend to the top of the hopper and are provided with operating handles 65 which may be readily reached by the driver in the seat on the tractor 10. As illustrated in Figures VIII, IX, X, the upper end of rods 60 pass through hollow tubes 66, which in turn are supported from brackets 67 bolted at 68 to the outside of the hopper 14. The handle 65 is screw threaded on to the upper end of the rod 60 by a screw threaded hub 69 and if desired, by merely turning the handle 65 the rod 60 will be raised or lowered by reason of this screw threaded connection therewith.

To provide a quick acting door control, I provide a toggle arrangement which includes a short sleeve 70 adapted to surround and slide on the upper end of tube 66 as shown in Figure IX, and between the short sleeve 70 and the hub 69 is located the compressible coil spring 72 compressed into the position shown in Figure VIII when the doors 17 and 18 are closed by the rods 60.

An auxiliary control handle 75 operates a toggle mechanism which permits the doors 17 and 18 to be quickly opened or closed as desired. Referring to Figure X, this handle 75 is connected to a yoke 76 which has a pair of downwardly extending curved lower arms 77 pivoted at 78 adjacent the lower end of tube 66 to the supporting bracket 67. A pair of links 80 are pivoted at 81 to the collar 70 on one end of the links, the other end of links 80 being pivoted at 82 to the side arms or yoke 76. It will be seen from Figures VIII, IX, and X that when the doors are in closed position, illustrated in Figure VIII, the pivots 82 of the toggle linkage are on the left hand of dead center between pivots 81 and 78, the handle 75 being in the uppermost position. When the handle 75 is depressed, it throws the pivots 82 to the right past dead center and the spring 72 being thereby released from compression immediately throws the parts into open position for the doors of the hopper, said open position being illustrated in Figure IX.

In Figure VI, I illustrate a very satisfactory welded spreader stand and connector for readily joining the spreader 12 to the tractor 10. Thus, in this particular embodiment thereof, I provide a curved base band 90 adapted to conform with the size and shape of the spinner plate, the open ends of band 90 having headed thereto, upwardly and rearwardly extending angle irons 91 having their upper ends welded to the cabinet or hopper 14 at 91' (see Figure VII) and a pair of pins 92 so that the same may be readily attached to the lift arms 93 (see Figures I and III), the lift arms 93 having holes therein to receive the pins 92. The hopper, as illustrated in Figure III, also has a downwardly extending connecting rod 95 pivoted at 96 to the top of the hopper 14 and a chain 96' may be used to further connect the hopper 14 to the tractor 10. Referring to Figure VI, the stand base 90 has welded thereto enlarged side walls and control plates 98 and the strap 99 connects the opposite ends of the yoke 90, as illustrated. It is understood that the upper ends of the angle irons 91 of the supporting stand 90 are welded to the edges of the hopper 14 as indicated in Figure VII.

It is apparent that within the scope of the invention, modifications and different arrangements may be made other than is herein disclosed, and the present disclosure is illustrative merely, the invention comprehending all variations thereof.

What I claim is:

In a dispensing mechanism having a cabinet and outlet door a quick release latch and door operating mechanism including a vertically positioned door operating rod extending to adjacent the top of the cabinet of said dispenser; a hub attached to said rod; a slidable sleeve on said rod; a compressible coiled spring located between said hub and said sleeve; a supporting bracket; and a toggle linkage between said sleeve and said supporting bracket arranged in one position to hold said spring in compression with the door of said cabinet closed and when said toggle is moved to its opposite position to permit said spring to open said cabinet door.

ROY A. SHAW.

REFERENCES CITED

The following references are of record in the file of this patent:

UNITED STATES PATENTS

| Number | Name | Date |
|---|---|---|
| 1,619,795 | Roby | Mar. 1, 1927 |
| 1,626,283 | Jensen | Apr. 26, 1927 |
| 1,650,808 | Van Brunt | Nov. 29, 1927 |
| 1,829,627 | Bamford et al. | Oct. 27, 1931 |
| 2,244,414 | Arndt | June 3, 1941 |
| 2,293,977 | Hoffstetter | Aug. 25, 1942 |
| 2,334,376 | Bauer | Nov. 16, 1943 |